(12) United States Patent
Tarao et al.

(10) Patent No.: US 7,985,800 B2
(45) Date of Patent: Jul. 26, 2011

(54) GOLF BALL

(75) Inventors: Toshiyuki Tarao, Kobe (JP); Satoko Okabe, Kobe (JP)

(73) Assignee: SRI Sports Limited, Kobe (JP)

( * ) Notice: Subject to any disclaimer, the term of this patent is extended or adjusted under 35 U.S.C. 154(b) by 435 days.

(21) Appl. No.: 12/289,958

(22) Filed: Nov. 7, 2008

(65) Prior Publication Data

US 2009/0124431 A1 May 14, 2009

(30) Foreign Application Priority Data

Nov. 8, 2007 (JP) ................................. 2007-291264

(51) Int. Cl.
*A63B 37/12* (2006.01)
*C08L 75/04* (2006.01)

(52) U.S. Cl. ........ 525/130; 525/127; 525/128; 473/379; 473/385

(58) Field of Classification Search .................... None
See application file for complete search history.

(56) References Cited

U.S. PATENT DOCUMENTS

| | | | |
|---|---|---|---|
| 4,674,751 A * | 6/1987 | Molitor et al. | ................ 473/385 |
| 5,692,974 A | 12/1997 | Wu et al. | |
| 6,822,028 B2 | 11/2004 | Takesue et al. | |
| 6,958,380 B2 | 10/2005 | Risen, Jr. et al. | |
| 2003/0199662 A1 * | 10/2003 | Risen et al. | ..................... 528/44 |

FOREIGN PATENT DOCUMENTS

| JP | 2000-513595 A | 10/2000 |
|---|---|---|
| JP | 2003-49028 A | 2/2003 |
| JP | 2003-327652 A | 11/2003 |
| JP | 2004-49914 A | 2/2004 |
| JP | 2005-111242 A | 4/2005 |
| JP | 2005-532436 A | 10/2005 |
| JP | 2006-28517 A | 2/2006 |

* cited by examiner

*Primary Examiner* — David Buttner
(74) *Attorney, Agent, or Firm* — Birch, Stewart, Kolasch & Birch, LLP

(57) ABSTRACT

The invention provides a golf ball excellent in abrasion resistance and a repulsion property. The present invention provides a golf ball comprising a core and a cover covering the core, wherein the cover is made from a cover composition containing, as a resin component, a thermoplastic polyurethane (A) having no ionic group; at least one kind of thermoplastic resin (B) selected from the group consisting of a binary copolymer of an olefin and an unsaturated carboxylic acid, a tertiary copolymer of an olefin, an unsaturated carboxylic acid and an unsaturated carboxylic acid ester, and neutralized products thereof; and an acid group-containing polyurethane and/or a neutralized product thereof (C).

17 Claims, No Drawings

GOLF BALL

FIELD OF THE INVENTION

The present invention relates to a golf ball, more particularly to a technique of simultaneously satisfying both of abrasion resistance and a repulsion property.

DESCRIPTION OF THE RELATED ART

As a base resin constituting a cover of golf balls, an ionomer resin or polyurethane is used. Covers containing an ionomer resin are widely used for their excellent repulsion property; however, a problem such as poor abrasion resistance is pointed out when their stiffness and hardness are lowered. On the other hand, polyurethane is used as the base resin constituting the cover since it improves abrasion resistance compared with an ionomer resin. However, a golf ball using thermoplastic polyurethane for the cover is insufficient in the repulsion property.

Further, covers containing a polyurethane ionomer as a thermoplastic polyurethane have been proposed (e.g. Japanese Patent Publications Nos. 2005-111242 A, 2006-28517 A and 2003-327652 A, and Japanese Patent Application National Publication No. 2000-513595 A). Japanese Patent Publication Nos. 2006-28517 A and 2003-327652 A disclose covers containing an anionic polyurethane ionomer; however, the covers tend to be brittle and there is a room for improvement on the abrasion resistance. Japanese Patent Application National Publication No. 2000-513595 A discloses a cationic polyurethane ionomer as a cover material of a golf ball; however, they are poor in processability and their use is limited.

Therefore, under the above circumstance, golf ball materials containing an ionomer resin and polyurethane have been proposed in order to simultaneously satisfy both of the repulsion property of an ionomer resin and abrasion resistance of polyurethane (e.g. Japanese Patent Publication Nos. 2003-49028 A and 2004-49914 A, and Japanese Patent Application National Publication No. 2005-532436 A).

SUMMARY OF THE INVENTION

However, as described in, for example, Japanese Patent Publication No. 2003-49028 A, with respect to a golf ball material containing polyurethane and an ionomer resin, when the compatibility between the polyurethane and the ionomer resin is insufficient, there has been a problem that the golf ball to be obtained is poor in abrasion resistance and the repulsion property. Further, with respect golf balls disclosed in Japanese Patent Publication No. 2004-49914 A and Japanese Patent Application National Publication No. 2005-532436 A, the balance between abrasion resistance and the repulsion property is insufficient and there is still room for improvement. The present invention has been achieved in view of the above circumstances, and an object of the present invention is to provide a golf ball excellent in abrasion resistance and the repulsion property.

The present invention, which has solved the above problem, provides a golf ball comprising a core and a cover covering the core, wherein the cover is made from a cover composition containing, as a resin component, a thermoplastic polyurethane (A) having no ionic group; at least one kind of thermoplastic resin (B) selected from the group consisting of a binary copolymer of an olefin and an unsaturated carboxylic acid, a tertiary copolymer of an olefin, an unsaturated carboxylic acid and an unsaturated carboxylic acid ester, and a neutralized product thereof; and an acid group-containing polyurethane and/or a neutralized product thereof (C).

Namely, when only the thermoplastic polyurethane (A) and the thermoplastic resin (B) are mixed, the compatibility between them is low. However, when the acid group-containing polyurethane and/or the neutralized product thereof (C) is added to them, the acid group-containing polyurethane and/or the neutralized product thereof (C) serves as a compatibilizer which compatibilizes the thermoplastic polyurethane (A) and the thermoplastic resin (B), and therefore the thermoplastic polyurethane (A) and the thermoplastic resin (B) are uniformly mixed. Thus, according to the present invention, a cover having both the excellent abrasion resistance of the thermoplastic polyurethane (A) and the excellent repulsion property of the thermoplastic resin (B) can be obtained.

The acid group of the acid group containing polyurethane may be a carboxyl group, a sulfonic acid group, or a phosphonic acid group. The acid group-containing polyurethane preferably has acid group content of $0.5 \times 10^{-4}$ mol/g to $20 \times 10^{-4}$ mol/g.

The cover composition preferably contains the acid group-containing polyurethane and/or the neutralized product thereof (C) in an amount of 1 part by mass to 50 parts by mass relative to 100 parts by mass of a total of the thermoplastic polyurethane (A) and the thermoplastic resin (B). The thermoplastic polyurethane (A) and the thermoplastic resin (B) are preferably blended in the cover composition (a total of 100 parts by mass) in a ratio of the thermoplastic polyurethane (A)/the thermoplastic resin (B)=5 parts to 95 parts/95 parts to 5 parts by mass. The cover composition preferably has a slab hardness of 30 or more and 57 or less in Shore D hardness.

According to the present invention, a golf ball excellent in the abrasion resistance and the repulsion property can be obtained.

DETAILED DESCRIPTION OF THE PREFERRED EMBODIMENTS

The present invention provides a golf ball comprising a core and a cover covering the core, wherein the cover is made from a cover composition containing, as a resin component, a thermoplastic polyurethane (A) having no ionic group; at least one kind of thermoplastic resin (B) selected from the group consisting of a binary copolymer of an olefin and an unsaturated carboxylic acid, a tertiary copolymer of an olefin, an unsaturated carboxylic acid and an unsaturated carboxylic acid ester, and a neutralized product thereof; and an acid group-containing polyurethane and/or a neutralized product thereof (C).

First, the thermoplastic polyurethane (A) having no ionic group will be explained. The thermoplastic polyurethane (A) having no ionic group used in the present invention is not particularly limited, as long as it does not have any ionic groups in a molecular chain, has a plurality of urethane bonds in a molecule and exhibits thermoplasticity. Here, the "polyurethane", for example, means a reaction product obtained by reacting a polyisocyanate component with a high-molecular weight polyol component to form urethane bonds in a molecule thereof, where necessary, obtained by further carrying out a chain extension reaction with a chain extender component such as a low-molecular weight polyol, polyamine or the like. Also, the "ionic group" means a functional group which can be ionized such as a carboxyl group and an amino group, and an ionized functional group thereof neutralized with an inorganic metal compound or the like. "Having no ionic group" means that there is no ionic group in a molecular chain formed with a plurality of urethane bonds; however, ionic groups (e.g. a hydroxyl group and an amino group derived from the polyol component and the chain extender component) may exist at a terminal of a main chain.

The polyisocyanate component, which constitutes the thermoplastic polyurethane (A) having no ionic group is not limited as long as it has at least two isocyanate groups. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), para-phenylene diisocyanate (PPDI); an alicyclic polyisocyanate or aliphatic polyisocyanate such as 4,4'-dicyclohexylmethane diisocyanate ($H_{12}MDI$), hydrogenated xylylenediisocyanate ($H_6XDI$), hexamethylene diisocyanate (HDI), isophorone diisocyanate (IPDI), and norbornene diisocyanate (NBDI). These may be used either alone or as a mixture of at least two of them.

In view of improving the abrasion-resistance, the aromatic polyisocyanate is preferably used as the polyisocyanate component of the thermoplastic polyurethane (A). A use of the aromatic polyisocyanate improves the mechanical property of the obtained polyurethane and provides the cover with the excellent abrasion-resistance. In addition, in view of improving the weather resistance, as the polyisocyanate component of the thermoplastic polyurethane (A), a non-yellowing type polyisocyanate such as TMXDI, XDI, HDI, $H_6XDI$, IPDI, $H_{12}MDI$ and NBDI is preferably used. More preferably, 4,4'-dicyclohexylmethane diisocyanate ($H_{12}MDI$) is used. Since 4,4'-dicyclohexylmethane diisocyanate ($H_{12}MDI$) has a rigid structure, the mechanical property of the resulting polyurethane is improved, and thus the cover which is excellent in abrasion-resistance can be obtained.

The high-molecular weight polyol constituting the thermoplastic polyurethane (A) is not limited, as long as it has a plurality of hydroxyl groups. Such examples include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. The above polyols may be used alone or as a mixture of at least two of them.

A number average molecular weight of the high-molecular weight polyol is not particularly limited, and for example, it is preferably 400 or more, more preferably 1,000 or more. If the number average molecular weight of the high-molecular weight polyol is too small, the resultant polyurethane becomes too hard and the shot feeling of the golf ball is lowered. The upper limit of the number average molecular weight of the high molecular weight polyol is not particularly limited, and it is preferably 10,000, more preferably 8,000. The number average molecular weight of the polyol component can be measured by Gel permeation Chromatography using two columns of TSK-GEL SUPREH 2500 (TOSOH Corporation) as a column, polystyrene as a standard material, and tetrahydrofuran as an eluate.

The high-molecular weight polyol, used as the polyol component, has a hydroxyl value of 500 mgKOH/g or less, more preferably 250 mgKOH/g or less, even more preferably 100 mgKOH/g or less. The hydroxyl value of the high molecular weight polyol can be measured for example, by an acetylation method according to JIS K1557-1.

The chain extender component which may constitute the thermoplastic polyurethane (A) includes a low-molecular weight polyol, a low-molecular weight polyamine and the like. Examples of the low-molecular weight polyol may include a diol such as ethylene glycol, diethylene glycol, triethylene glycol, propanediol (e.g., 1,2-propanediol, 1,3-propanediol, and 2-methyl-1,3-propanediol), dipropylene glycol, butanediol (e.g., 1,2-butanediol, 1,3-butanediol, 1,4-butanediol, 2,3-butanediol, and 2,3-dimethyl-2,3-butanediol), neopentyl glycol, pentanediol, hexanediol, heptanediol, octanediol, 1,6-cyclohexanedimethylol, an aniline diol, and bisphenol A diol; a triol such as glycerin, trimethylol propane, and hexanetriol; a tetraol or a hexanol such as pentaerythritol and sorbitol.

The low-molecular weight polyamine that can be used as a chain extender may include any polyamine, as long as it has at least two amino groups. The polyamine includes an aliphatic polyamine such as ethylenediamine, propylenediamine, butylenediamine, and hexamethylenediamine, an alicyclic polyamine such as isophoronediamine, piperazine, and an aromatic polyamine.

The aromatic polyamine has no limitation as long as it has at least two amino groups directly or indirectly bonded to an aromatic ring. Herein, the "indirectly bonded to the aromatic ring", for example, means that the amino group is bonded to the aromatic ring via a lower alkylene bond. Further, the aromatic polyamine includes, for example, a monocyclic aromatic polyamine having at least two amino groups bonded to one aromatic ring or a polycyclic aromatic polyamine having at least two aminophenyl groups each having at least one amino group bonded to one aromatic ring.

Examples of the monocyclic aromatic polyamine include a type such as phenylenediamine, tolylenediamine, diethyltoluenediamine, and dimethylthiotoluenediamine wherein amino groups are directly bonded to an aromatic ring; and a type such as xylylenediamine wherein amino groups are bonded to an aromatic ring via a lower alkylene group. Further, the polycyclic aromatic polyamine may include a poly (aminobenzene) having at least two aminophenyl groups directly bonded to each other or a compound having at least two aminophenyl groups bonded via a lower alkylene group or an alkylene oxide group. Among them, a diaminodiphenylalkane having two aminophenyl groups bonded to each other via a lower alkylene group is preferable. Typically preferred are 4,4'-diaminodiphenylmethane or the derivatives thereof.

The thermoplastic polyurethane (A) has no limitation on the constitutional embodiments thereof. Examples of the constitutional embodiments are the embodiment where the polyurethane consists of the polyisocyanate component and the high-molecular weight polyol component; the embodiment where the polyurethane consists of the polyisocyanate component, the high-molecular weight polyol component and the low-molecular weight polyol component; and the embodiment where the polyurethane consists of the polyisocyanate component, the high-molecular weight polyol component, the low-molecular weight polyol component, and the polyamine component; and the embodiment where the polyurethane consists of the polyisocyanate component, the high-molecular weight polyol component and the polyamine component.

The thermoplastic polyurethane (A) preferably has a slab hardness of 15 or more, more preferably 20 or more, and preferably has a slab hardness of 50 or less, more preferably 45 or less, and even more preferably 42 or less in Shore D hardness. If the slab hardness of the thermoplastic polyurethane (A) is too low, the amount of spin may increase at the driver shot. On the other hand, if the slab hardness of the thermoplastic polyurethane (A) is too high, the amount of spin may be too lowered at the approach wedge shot. Specific examples of the thermoplastic polyurethane (A) include "Elastollan" (registered trademark) manufactured by BASF Japan, Ltd. (e.g. Elastollan XNY 90A, XNY 75A, ET 880, and the like).

Next, at least one kind of the thermoplastic resin (B) selected from the group consisting of a binary copolymer of an olefin and an unsaturated carboxylic acid, a tertiary copolymer of an olefin, an unsaturated carboxylic acid and an unsaturated carboxylic acid ester, and a neutralized product thereof will be explained.

The olefin constituting the binary copolymer of the olefin and the unsaturated carboxylic acid, or the tertiary copolymer of the olefin, the unsaturated carboxylic acid and the unsaturated carboxylic acid ester is not particularly limited as long as it has at least one carbon-carbon double bond in a molecule; however, an α-olefin having a carbon-carbon double bond at a terminal of a molecular chain is preferable. Examples of the α-olefin are ethylene, propylene, 1-butene, isobutene, 1-pentene and the like. These may be used either alone or as a mixture of at least two of them. Among them, ethylene or propylene is preferable.

The unsaturated carboxylic acid constituting the binary copolymer of the olefin and the unsaturated carboxylic acid, or the tertiary copolymer of the olefin, the unsaturated carboxylic acid and the unsaturated carboxylic acid ester is not particularly limited as long as it has at least one carboxyl group and at least one carbon-carbon double bond in a molecule; however, an α,β-unsaturated carboxylic acid in which carbon atoms at α and β-positions form a double bond is preferable. The α,β-unsaturated carboxylic acid preferably has 3 to 18 carbon atoms, more preferably 3 to 8 carbon atoms. Examples of the α,β-unsaturated carboxylic acid having 3 to 18 carbon atoms include acrylic acid, methacrylic acid, fumaric acid, maleic acid, crotonic acid (trans-2-butenoic acid), isocrotonic acid (cis-2-butenoic acid), sorbic acid, citraconic acid, mesaconic acid, and the like. These unsaturated carboxylic acids may be used either alone or as a mixture of at least two of them. Among them, acrylic acid or methacrylic acid is preferable.

The unsaturated carboxylic acid ester constituting the tertiary copolymer of the olefin, the unsaturated carboxylic acid and the unsaturated carboxylic acid ester is obtained by esterification of a carboxyl group of the unsaturated carboxylic acid, and is preferably the α,β-unsaturated carboxylic acid ester. The α,β-unsaturated carboxylic acid ester preferably has 4 to 22 carbon atoms. Examples of the α,β-unsaturated carboxylic acid ester having 4 to 22 carbon atoms include methyl, ethyl, propyl, n-butyl, and isobutyl esters of acrylic acid, methacrylic acid, fumaric acid, maleic acid, crotonic acid (trans-2-butenoic acid), isocrotonic acid (cis-2-butenoic acid), sorbic acid, citraconic acid, mesaconic acid, and the like. These unsaturated carboxylic acid ester may be used either alone or as a mixture of at least two of them. Among these esters, acrylic acid ester and methacrylic acid ester are preferable.

As the binary copolymer of the olefin and the unsaturated carboxylic acid used in the present invention, the binary copolymer of the α-olefin and the α,β-unsaturated carboxylic acid is preferable and the binary copolymer obtained by copolymerization of ethylene and (meth)acrylic acid is particularly preferable. Also, as the tertiary copolymer of the olefin, the unsaturated carboxylic acid and the unsaturated carboxylic acid ester used in the present invention, the tertiary copolymer of the α-olefin, the α,β-unsaturated carboxylic acid and the α,β-unsaturated carboxylic acid ester is preferable and the tertiary copolymer obtained by copolymerization of ethylene, (meth)acrylic acid and (meth)acrylic acid ester is particularly preferable.

The binary copolymer used in the present invention preferably contains the olefin in an amount of 80 mass % or more, more preferably 90 mass % or more, and the unsaturated carboxylic acid in an amount of 10 mass % to 20 mass %. Also, the tertiary copolymer preferably contains the olefin in an amount of 70 mass % to 85 mass %, the unsaturated carboxylic acid in an amount of 5 mass % to 30 mass %, and the unsaturated carboxylic acid ester in an amount of 1 mass % to 25 mass %.

The thermoplastic resin (B) preferably has an acid group content of $0.5 \times 10^{-4}$ mol/g or more, more preferably $1.0 \times 10^{-4}$ mol/g or more, and preferably has an acid group content of $20 \times 10^{-4}$ mol/g or less, and more preferably $15 \times 10^{-4}$ mol/g or less. If the thermoplastic resin (B) has an acid group content of more than $20 \times 10^{-4}$ mol/g, the fluidity of the thermoplastic resin (B) may decrease, resulting in lowering the moldability. On the other hand, if the thermoplastic resin (B) has an acid group content of less than $0.5 \times 10^{-4}$ mol/g, the interface strength between the thermoplastic polyurethane (A) and the thermoplastic resin (B) may be reduced, resulting in lowering the durability of the cover.

Here, the "acid group content" of the thermoplastic resin (B) means a number (mol/g) of the acid group contained per unit mass of the thermoplastic resin (B) and is calculated according to the following formula.

$$\text{Acid group content (mol/g)} = \frac{|\text{Mass of acid groups in the thermoplastic resin }(B)/\text{Molecular mass of an acidic group}|}{\text{Total mass of the thermoplastic resin }(B)}$$

Specific examples of the binary copolymers obtained by copolymerization of ethylene and (meth)acrylic acid include "NUCREL (registered trademark) (e.g. NUCREL AN4214C, NUCREL AN4225C, NUCREL AN42115C, NUCREL N0903HC, NUCREL N0908C, NUCREL AN42012C, NUCREL N410, NUCREL N1035, NUCREL N1050H, NUCREL N1108C, NUCREL N1110H, NUCREL N1207C, NUCREL N1214, NUCREL AN4221C, NUCREL N1525, NUCREL N1560, NUCREL N0200H, NUCREL AN4228C, NUCREL N4213C, and NUCREL N035C)" in tradenames commercially-supplied by Mitsui-DuPont Polychemicals Co., Ltd. Also, specific examples of the tertiary copolymers obtained by copolymerization of ethylene, (meth)acrylic acid and (meth)acrylic acid ester include "NUCREL (registered trademark) (e.g. NUCREL AN4311 and NUCREL AN4318)" in tradenames.

As the neutralized product of the binary copolymer of the olefin and the unsaturated carboxylic acid or the tertiary copolymer of the olefin, the unsaturated carboxylic acid and the unsaturated carboxylic acid ester, it is preferable to use a product obtained by neutralizing at least a part of carboxyl groups of the unsaturated carboxylic acids in the binary copolymer of the olefin and the unsaturated carboxylic acid or in the tertiary copolymer of the olefin, the unsaturated carboxylic acid and the unsaturated carboxylic acid ester with a metal ion.

Examples of the metal (ion) neutralizing at least a part of the carboxyl groups of the unsaturated carboxylic acids in the binary copolymer of the olefin and the unsaturated carboxylic acid or in the tertiary copolymer of the olefin, the unsaturated carboxylic acid and the unsaturated carboxylic acid ester include an alkali metal (ion) such as sodium, potassium, and lithium; a divalent metal (ion) such as magnesium, calcium, zinc, barium, and cadmium; a trivalent metal (ion) such as aluminum; and other metals (ions) such as tin and zirconium. For improvement of the repulsion property and durability, sodium, zinc, or magnesium (ion) is particularly preferable.

Neutralizing may be carried out by, for example, melting the binary copolymer or the tertiary copolymer by high pressure radical copolymerization, adding a predetermined amount of the inorganic metal compound to the melted copolymer, and kneading them. Specifically, neutralizing may be carried out by melting and kneading the copolymer and the inorganic metal compound at the temperature of 150° C. to 300° C. using an extrusion molding apparatus. Examples of the inorganic metal compound include a hydroxide, an oxide, a carbonated compound (a carbonate), a hydrogen-carbonated compound (a bicarbonate), a phosphorylated compound (a phosphate), a sulfated acid compound (a sulfate), and an acetate of the metal. Among them, an acetate is preferable and, for example, magnesium acetate is preferably used.

The neutralized product of the binary copolymer of the olefin and the unsaturated carboxylic acid or the tertiary copolymer of the olefin, the unsaturated carboxylic acid and the unsaturated carboxylic acid ester preferably has the carboxyl group of a neutilization degree of 5 mol % or more, more preferably 10 mol % or more, even more preferably 20 mol % or more, and preferably has the carboxyl group of a neutilization degree of 100 mol % or less, more preferably 90 mol % or less, and even more preferably 80 mol % or less. The "neutralization degree" of the neutralized product of the binary copolymer of the olefin and the unsaturated carboxylic acid or the neutralized product of the tertiary copolymer of the olefin, the unsaturated carboxylic acid and the unsaturated carboxylic acid ester is defined by the following formula.

$$\text{Neutralization degree (mol \%)} = \frac{\begin{vmatrix}\text{Number of moles of a neutralized carboxyl group in the} \\ \text{neutralized product of the binary} \\ \text{copolymer or the tertiary copolymer}\end{vmatrix}}{\text{Number of moles of a carboxyl group of the binary}} \times 100$$
$$\text{copolymer or the tertiary copolymer}$$

Examples of the neutralized product of the binary copolymer of the olefin and the unsaturated carboxylic acid or the neutralized product of the tertiary copolymer of the olefin, the unsaturated carboxylic acid and the unsaturated carboxylic acid ester include an ionomer resin.

Specific examples of the ionomer resins include, but not limited to, Himilan 1555(Na), Himilan 1557(Zn), Himilan 1605(Na), Himilan 1706(Zn), Himilan 1707(Na), Himilan AM7311 (Mg), and examples of the ternary copolymer ionomer resin include Himilan 1856(Na) and Himilan 1855(Zn) available from MITSUI-DUPONT POLYCHEMICAL CO., LTD.

Further, ionomer resins available from DUPONT CO. include Surlyn 8945(Na), Surlyn 9945(Zn), Surlyn 8140(Na), Surlyn 8150(Na), Surlyn 9120(Zn), Surlyn 9150 (Zn), Surlyn 6910(Mg), Surlyn 6120(Mg), Surlyn 7930(Li), Surlyn 7940(Li), Surlyn AD8546(Li), and examples of the ternary copolymer ionomer resin include Surlyn 8120 (Na), Surlyn 8320 (Na), Surlyn 9320 (Zn), and Surlyn 6320(Mg).

Ionomer resins such as Iotek 8000(Na), Iotek 8030(Na), Iotek 7010 (Zn), and Iotek 7030(Zn) are available from Exxon Co. Examples of the ternary copolymer ionomer resin include Iotek 7510(Zn) and Iotek 7520(Zn). The ionomer resins exemplified above can be used alone, or as a mixture of two or more.

The thermoplastic polyurethane (A) and the thermoplastic resin (B) are blended in the resin component of the cover composition (a total of 100 parts by mass) preferably in a ratio of the thermoplastic polyurethane (A)/the thermoplastic resin (B)=5 parts to 95 parts/95 parts to 5 parts by mass, and more preferably 30 parts to 80 parts/70 parts to 20 parts by mass. If the blending ratio of the thermoplastic polyurethane (A) is more than 95 parts by mass, the repulsion property of the cover may be lowered, while if the blending ratio of the thermoplastic resin (B) is more than 95 parts by mass, the cover may be too stiff, resulting in lowering the abrasion resistance.

Next, the acid group-containing polyurethane and/or the neutralized product thereof (C) will be explained.

The acid group-containing polyurethane is not particularly limited as long as it has a plurality of urethane bonds and at least one acid group incorporated in a molecule. Herein, "polyurethane" is a reaction product obtained, for example, by reacting a polyisocyanate component with a high-molecular weight polyol component to form urethane bonds in a molecule thereof, where necessary, further carrying out a chain extension reaction with a chain extender component such as a low-molecular weight polyol or polyamine, similarly to the thermoplastic polyurethane (A). Examples of the polyisocyanate component, the high-molecular weight polyol component, and the chain extender component include those exemplified as used in the thermoplastic polyurethane (A).

Additionally, the acid group-containing polyurethane may be either thermoplastic polyurethane or thermosetting polyurethane; however, thermoplastic polyurethane is preferable. The thermoplastic polyurethane is polyurethane exhibiting plasticity by heating and generally means polyurethane having a straight chain structure of a high molecular weight to a certain extent. On the other hand, the thermosetting polyurethane (two-component curing type polyurethane) is polyurethane obtained by temporarily preserving a low-molecular weight urethane prepolymer, and reacting the prepolymer with a chain extender (curing agent) to increase a molecular weight thereof immediately before molding the cover. The thermosetting polyurethane includes polyurethane having a straight chain structure or polyurethane having a three-dimensional crosslinked structure depending on a number of a functional group of the prepolymer or the chain extender (curing agent) to be used.

As a method for introducing the acid group into the polyurethane, a conventional method may be used. For example, the embodiment where an acid group-containing high-molecular weight polyol is used as a part of the high-molecular weight polyol component; the embodiment where an acid group-containing chain extender is used as a part or a whole of the chain extender component; and the embodiment where an acid group-containing polyol and an acid group-containing chain extender are respectively used as a part of the high-molecular weight polyol component and as a part or a whole of the chain extender; are indicated. Examples of the acid group introduced into polyurethane include a carboxyl group, a sulfonic acid group and a phosphonic acid group, and at least one kind of these groups may be introduced. Herein, the carboxyl group, the sulfonic acid group, and the phosphonic acid group are defined by the following formulae (1), (2) and (3), respectively.

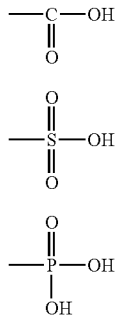

Examples of the acid group-containing high-molecular weight polyol include an acid group-containing polyester polyol; an acid group-containing polyether polyol; an acid group-containing polycarbonate polyol; and an acid group-containing polyacrylic polyol. These polyols can be synthesized by a conventional method. For example, a polyester polyol can be obtained by polycondensation of the low-molecular weight polyol and a polybasic acid, and the acid group-containing polyester polyol can be synthesized by using an acid group-containing component such as dimethylolpropionic acid, dimethylolbutanoic acid, dihydroxypropionic acid and dihydroxysuccinic acid as at least a part of the low-molecular weight polyol; an acid group-containing component such as trimellitic anhydride and pyromellitic anhydride as at least a part of the polybasic acid; or an acid group-containing component for both of the low-molecular weight polyol and the polybasic acid.

Examples of the acid group-containing chain extender include a carboxyl group-containing diol such as dimethylolpropionic acid, dimethylolbutanoic acid, dihydroxypropionic acid and dihydroxysuccinic acid; a sulfonic acid group-containing diol such as 1,3-di(hydroxymethyl)-5-sulfo-diisophthalate, 1,3-di(2-hydroxyethyl)-5-sulfo-diisophthalate, 1,3-di(3-hydroxypropyl)-5-sulfo-diisophthalate, 1,3-di(4-hydroxy-n-butyl)-5-sulfo-diisophthalate, 1,3-di(5-hydroxy-n-pentyl)-5-sulfo-diisophthalate and 1,3-di(6-hydroxy-n-hexyl)-5-sulfo-diisophthalate; and a phosphonic acid group-containing component such as 1,3-di(hydroxymethyl)-5-phospho-diisophthalate. Among them, a carboxyl group-containing diol such as dimethylolpropionic acid and dimethylolbutanoic acid is preferable.

The acid group-containing polyurethane preferably has an acid group content of $0.5 \times 10^{-4}$ mol/g or more, more preferably $1.0 \times 10^{-4}$ mol/g or more, and preferably has an acid group content of $20 \times 10^{-4}$ mol/g or less, and more preferably $15 \times 10^{-4}$ mol/g or less. If the acid group content is more than $20 \times 10^{-4}$ mol/g, the fluidity of the polyurethane may be decreased, resulting in lowering the moldability, while if the acid group content is less than $0.5 \times 10^{-4}$ mol/g, the interface strength between the thermoplastic polyurethane (A) and the thermoplastic resin (B) may be reduced, resulting in lowering the durability of the cover.

Here, the "acid group content" of the acid group-containing polyurethane means a number (mol/g) of the acid group contained per unit mass of the polyurethane and is calculated according to the following formula.

$$\text{Acid group content (mol/g)} = \frac{|\text{Mass of acidic groups in polyurethane}/\text{Molecular mass of an acidic group}|}{\text{Mass of polyurethane}}$$

The neutralized product of the acid group-containing polyurethane is a compound obtained by neutralizing at least a part of the acid group of the acid group-containing polyurethane with metal ion, that is, a polyurethane ionomer. Examples of the metal (ion) include an alkali metal (ion) such as sodium, potassium, and lithium; a divalent metal (ions) such as magnesium, calcium, zinc, barium, and cadmium; trivalent metals (ions) such as aluminum; and other metals (ions) such as tin and zirconium. For improvement of the repulsion property and durability, sodium, zinc, or magnesium (ion) is particularly preferable.

Examples of a method for producing the neutralized product of the acid group-containing polyurethane include a prepolymer method which comprises the steps of producing a prepolymer by reacting the polyisocyanate component with the high-molecular weight polyol component, further reacting the obtained prepolymer with the acid group-containing chain extender component to obtain the acid group-containing polyurethane, and neutralizing the acid group of the obtained polyurethane with a metal salt; and a one-shot method which comprises the steps of obtaining the acid group-containing polyurethane by reacting the polyisocyanate component, the high-molecular weight polyol component and the acid group-containing chain extender component to obtain the acid group-containing polyurethane, and neutralizing an acid group of the obtained polyurethane with a metal salt. In the present invention, a preferable method is obtaining the acid group-containing high-molecular weight polyurethane and then neutralizing an acid group of the obtained polyurethane with a metal salt. Further, a catalyst, a solvent or the like may be used properly for synthesis and neutralization of the polyurethane ionomer if necessary.

The neutralization degree of the neutralized product of the acid group-containing polyurethane used in the present invention is preferably less than 50 mol %, more preferably 40 mol % or less, and even more preferably 30 mol % or less. If the neutralization degree is less than 50 mol %, the compatibility between the thermoplastic polyurethane (A) and the thermoplastic resin (B) is improved, resulting in improving a repulsion coefficient and abrasion resistance of the obtained golf ball. Additionally, in the case of using a divalent metal, two carboxyl groups are neutralized with one divalent metal.

The "neutralization degree" of the neutralized product of the acid group-containing polyurethane is defined by the following formula.

$$\text{Neutralization degree (mol \%)} = \frac{|\text{Number of moles of an ionized acid group in the neutralized product of the acidic group-containing polyurethane}|}{\text{Number of moles of an acid group in the neutralized product of the acid group-containing polyurethane}} \times 100$$

The content of the acid group-containing polyurethane and/or the neutralized product thereof (C) in the resin component of the cover composition is preferably 1 part by mass or more, more preferably 5 parts by mass or more, even more preferably 10 parts by mass or more, and preferably 50 parts by mass or less, more preferably 40 parts by mass or less, and even more preferably 20 parts by mass or less relative to 100 parts by mass of a total of the thermoplastic polyurethane (A) and the thermoplastic resin (B). If the content of the acid group-containing polyurethane and/or the neutralized product thereof (C) is less than 1 part by mass, the compatibility between the thermoplastic polyurethane (A) and the thermoplastic resin (B) may not be improved, resulting in lowering the durability of the cover. On the other hand, if the content of the acid group-containing polyurethane and/or the neutralized product thereof (C) is more than 50 parts by mass, the content of the thermoplastic polyurethane (A) and the thermoplastic resin (B) are decreased and therefore the abrasion resistance due to the thermoplastic polyurethane (A) and the repulsion property due to the thermoplastic resin (B) may not be obtained sufficiently.

Examples of the combination of at least one kind of the thermoplastic resin (B) selected from the group consisting of the binary copolymer of the olefin and the unsaturated carboxylic acid, the tertiary copolymer of the olefin, the unsaturated carboxylic acid and the unsaturated carboxylic acid ester, and the neutralized product thereof and the acid group-containing polyurethane and/or the neutralized product thereof (C) contained as the resin component in the cover composition of the present invention include, for example, (i) an embodiment of using neutralized products for both; (ii) an embodiment of using a neutralized product for one and an un-neutralized product for the other; (iii) an embodiment of using un-neutralized products for both; and (iv) an embodiment of using mixtures of a neutralized product and an un-neutralized product respectively for both. Among them, the embodiment of using a neutralized product for one and an un-neutralized product for the other (the embodiment (ii)) is preferable and the embodiment of using the neutralized product of the binary copolymer and/or the tertiary copolymer as the thermoplastic resin (B) and the acid group-containing polyurethane (un-neutralized product) as the acid group-containing polyurethane and/or the neutralized product thereof (C) is particularly preferable.

The reason why the embodiment of using the neutralized product for one of the thermoplastic resin (B) and the acid group-containing polyurethane and/or the neutralized product thereof (C) and the un-neutralized product for the other is preferable is not necessarily uncertain. However, it is supposed that an ion cluster formed by neutralizing the acid group of the neutralized product with metal ion attracts the acid group contained in the un-neutralized product and then both are compatibilized.

The cover composition of the golf ball of the present invention, as a resin component, preferably consists of the thermoplastic polyurethane (A) having no ionic group; at least one kind of the thermoplastic resin (B) selected from the group consisting of the binary copolymer of the olefin and the unsaturated carboxylic acid, the tertiary copolymer of the olefin, the unsaturated carboxylic acid and the unsaturated carboxylic acid ester, and the neutralized product thereof; and the acid group-containing polyurethane and/or the neutralized product thereof (C). However, the cover composition may further contain another resin component as a resin component in addition to the thermoplastic polyurethane (A), the thermoplastic resin (B), and the acid group-containing polyurethane and/or the neutralized product thereof (C) to an extent that the effects of the invention are not impaired.

Example of other resin components include a thermoplastic polyamide elastomer having a commercial name of "PEBAX", for example, "PEBAX 2533" available from ARKEMA Inc, a thermoplastic polyester elastomer having a commercial name of "HYTREL", for example, "HYTREL 3548", and "HYTREL 4047" available from DU PONT-TORAY Co., and a thermoplastic polystyrene elastomer having a commercial name of "Rabalon" available from Mitsubishi Chemical Co.

The cover composition used in the present invention may contain, other than the above-mentioned resin component, a pigment component such as zinc oxide, titanium oxide and a blue pigment, a gravity adjusting agent such as calcium carbonate and barium sulfate, a dispersant, an antioxidant, an ultraviolet absorber, a light stabilizer, a fluorescent material or a fluorescent brightener to the extent that the cover performance is not damaged.

The content of the white pigment (titanium oxide) is preferably 0.5 part by mass or more, more preferably 1 part by mass or more, and preferably 10 parts by mass or less, more preferably 8 parts by mass or less based on 100 parts by mass of the thermoplastic polyurethane (A) constituting the cover. The white pigment in an amount of 0.5 part by mass or more can impart opacity to the cover, while the white pigment in an amount of more than 10 parts by mass may lower the durability of the resulting cover.

In the method for preparing the golf ball of the present invention, the thermoplastic polyurethane (A) having no ionic group; at least one kind of the thermoplastic resin (B) selected from the group consisting of the binary copolymer of the olefin and the unsaturated carboxylic acid, the tertiary copolymer of the olefin, the unsaturated carboxylic acid and the unsaturated carboxylic acid ester, and the neutralized product thereof; the acid group-containing polyurethane and/or the neutralized product thereof (C); and if necessary, an additive for the cover are blended to obtain a cover composition. The blending of the cover composition is preferably carried out using, for example, a mixer capable of blending a raw material in the form of a pellet, more preferably a tumbler type mixer. An embodiment of blending the cover composition include, for example, an embodiment of mixing the thermoplastic polyurethane (A), the thermoplastic resin (B), the acid group-containing polyurethane and/or the neutralized product thereof (C), and an additive for the cover such as titanium oxide, and subjecting the resultant mixture to extrusion to prepare a pellet; an embodiment of mixing the thermoplastic polyurethane (A) and an additive for the cover such as titanium oxide, and subjecting the resultant mixture to extrusion to prepare a white pellet in advance, and dry-blending the white pellet and a pellet of the thermoplastic resin (B) and the acid group-containing polyurethane and/or the neutralized product thereof (C); and the like.

In the case of preparing the cover composition by using the neutralized product of the binary copolymer of the olefin and the unsaturated carboxylic acid or the tertiary copolymer of the olefin, the unsaturated carboxylic acid and the unsaturated carboxylic acid ester as the thermoplastic resin (B); and the neutralized product of the acid group-containing polyurethane as the acid group-containing polyurethane and/or the neutralized compound thereof (C), two methods may be employed. That is, a method of separately preparing the neutralized product of the thermoplastic resin (B) and the neutralized product of the acid group-containing polyurethane (C) to use them as raw materials; and a method of simultaneously neutralizing both of the thermoplastic resin (B) and the acid group-containing polyurethane (C) by adding the above inorganic metal compound to both of the un-neutralized compounds of raw materials and mixing the resultant may be employed.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding). In the case of directly injection molding the cover composition onto the core, it is preferred to use upper and lower molds for forming a cover having a spherical cavity and pimples, wherein a part of the pimple also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 150° C. to 230° C. is charged into a mold held under the pressure of 980 KPa to 1,500 KPa for 0.1 to 1 second. After cooling for 15 to 60 seconds, the mold is opened and the golf ball with the cover molded is taken out from the mold.

Molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a cover for a golf ball having a uniform thickness can be formed.

When molding a cover, the concave portions called "dimple" are usually formed on the surface. After the cover is molded, the mold is opened and the golf ball body is taken out from the mold, and as necessary, the golf ball body is preferably subjected to surface treatment such as deburring, cleaning, and sandblast. If desired, a paint film or a mark may be formed.

The thickness of the cover of the golf ball of the present invention is not particularly limited; however, it is preferably 0.3 mm or more, more preferably 0.5 mm or more, and even more preferably 0.7 mm or more. If the thickness of the cover is too thin, the abrasion resistance may be lowered. Also, the thickness of the cover is preferably 2.5 mm or less, more preferably 2.3 mm or less, and even more preferably 2.1 mm or less. If the thickness of the cover is too thick, the repulsion property may be lowered.

The cover composition preferably has the slab hardness of 30 or more, more preferably 32 or more, and even more preferably 34 or more, and preferably has the slab hardness of 57 or less, more preferably 55 or less in Shore D hardness. If the slab hardness of the cover is less than 30, the repulsion property of the golf ball may be lowered, resulting in shortening a flight distance, while if the cover hardness is more than 57, the durability of the obtained golf ball may be lowered. The slab hardness of the cover can be measured by molding the cover composition into a sheet with a thickness of about 2 mm by hot press molding, preserving the sheet at 23° C. for 2 weeks, stacking three or more of the preserved sheet on one another to avoid being effected by the measuring substrate on which the sheets are placed and carrying out the measurement of the stack by Shore D type spring hardness tester prescribed by ASTM-D2240.

Next, a preferable embodiment of the core of the golf ball of the present invention will be explained.

The core of the golf ball of the present invention includes a single-layered core, a core consisting of a center and a single-layered intermediate layer covering the center, a core consisting of a center and multi-piece or multi-layer of intermediate layers covering the center. The core preferably has a spherical shape. If the core does not have a spherical shape, the cover does not have a uniform thickness. As a result, there exist some portions where the performance of the cover is lowered. On the other hand, the center generally has the spherical shape, but the center may be provided with a rib on the surface thereof so that the surface of the spherical center is divided by the ribs. For example, the surface of the spherical center is evenly divided by the ribs. In one embodiment, the ribs are preferably formed on the surface of the spherical center in an integrated manner, and in another embodiment, the ribs are formed as an intermediate layer on the surface of the spherical center.

The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east (west), assuming that the meridian as the standard is at longitude 0 degrees. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

As the core or the center of the golf ball of the present invention, a conventionally known rubber composition (hereinafter simply referred to as "rubber composition for the core" occasionally) may be employed, and it can be molded by, for example, heat-pressing a rubber composition containing a base rubber, a crosslinking initiator, a co-crosslinking agent, and a filler.

As the base rubber, a natural rubber and/or a synthetic rubber such as a polybutadiene rubber, a natural rubber, a polyisoprene rubber, a styrene polybutadiene rubber, and ethylene-propylene-diene terpolymer (EPDM) may be used. Among them, typically preferred is the high cis-polybutadiene having cis-1,4 bond in a proportion of 40% or more, more preferably 70% or more, even more preferably 90% or more in view of its superior repulsion property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and preferably 3 parts by mass or less, more preferably 2 parts by mass or less based on 100 parts by mass of the base rubber. If the amount is less than 0.2 part by mass, the core becomes too soft, and the resilience tends to be lowered, and if the amount is more than 3 parts by mass, the amount of co-crosslinking agent needs to be increased in order to obtain an appropriate hardness, so that the resilience tends to be insufficient.

The co-crosslinking agent is not particularly limited as long as it has the effect of crosslinking a rubber molecule by graft polymerization with a base rubber molecular chain; for example, $\alpha,\beta$-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high resilience. The amount of the co-crosslinking agent to be used is preferably 10 parts or more, more preferably 20 parts or more, and is preferably 50 parts or less, more preferably 40 parts or less based on 100 parts of the base rubber by mass. If the amount of the co-crosslinking agent to be used is less than 10 parts by mass, the amount of the organic peroxide must be increased to obtain an appropriate hardness which tends to lower the resilience. On the other hand, if the amount of the co-crosslinking agent to be used is more than 50 parts by mass, the core becomes too hard, so that the shot feeling may be lowered.

The filler contained in the rubber composition for the core is mainly blended as a gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 2 parts or more, more preferably 3 parts or more, and preferably 50 parts or less, more preferably 35 parts or less based on 100 parts of the base rubber by mass. If the amount of the filler to be blended is less than 2 parts by mass, it becomes difficult to adjust the weight, while if it is more than 50 parts by mass, the weight ratio of the rubber component becomes small and the resilience tends to be lowered.

As the rubber composition for the core, an organic sulfur compound, an antioxidant or a peptizing agent may be blended as appropriate in addition to the base rubber, the crosslinking initiator, the co-crosslinking agent and the filler.

As the organic sulfur compound, a diphenyl disulfide or a derivative thereof may be preferably used. Examples of the diphenyl disulfide or the derivative thereof include diphenyl disulfide, a mono-substituted diphenyl disulfide such as bis (4-chlorophenyl)disulfide, bis(3-chlorophenyl)disulfide, bis (4-bromophenyl)disulfide, bis(3-bromophenyl)disulfide, bis (4-fluorophenyl)disulfide, bis(4-iodophenyl)disulfide and bis (4-cyanophenyl)disulfide; a di-substituted diphenyl disulfide such as bis(2,5-dichlorophenyl)disulfide, bis (3,5-dichlorophenyl)disulfide, bis(2,6-dichlorophenyl)disulfide, bis(2, 5-dibromophenyl)disulfide, bis (3,5-dibromophenyl)disulfide, bis(2-chloro-5-bromophenyl)disulfide, and bis(2-cyano-5-bromophenyl)disulfide; a tri-substituted diphenyl disulfide such as bis (2,4,6-trichlorophenyl)disulfide, and bis (2-cyano-4-chloro-6-bromophenyl)disulfide; a tetra-substituted diphenyl disulfide such as bis (2,3,5,6-tetra chlorophenyl)disulfide; a penta-substituted diphenyl disulfide such as bis(2,3,4,5,6-pentachlorophenyl)disulfide and bis(2,3,4,5,6-pentabromophenyl)disulfide. These diphenyl disulfides or the derivative thereof can enhance resilience by having some influence on the state of vulcanization of vulcanized rubber. Among them, diphenyl disulfide and bis(pentabromophenyl) disulfide are preferably used since a golf ball having particularly high resilience can be obtained. The amount of the diphenyl disulfide or the derivative thereof to be blended is preferably 0.1 part by mass or more, more preferably 0.3 part by mass or more, and preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

The conditions for press-molding the rubber composition should be determined depending on the rubber composition. The press-molding is preferably carried out for 10 to 60 minutes at the temperature of 130 to 200° C. Alternatively, the press-molding is preferably carried out in a two-step heating, for example, for 20 to 40 minutes at the temperature of 130 to 150° C., and continuously for 5 to 15 minutes at the temperature of 160 to 180° C.

In the case that the golf ball of the present invention is a three-piece golf ball or a multi-piece golf ball, examples of the material for the intermediate layer are a thermoplastic polyamide elastomer having a commercial name of "Pebax (registered trademark) (e.g. Pebax 2533)" available from Arkema; a thermoplastic polyester elastomer having a commercial name of "Hytrel (registered trademark) (e.g. Hytrel 3548, Hytrel 4047)" available from Du Pont-Toray Co., Ltd.; a thermoplastic polyurethane elastomer having a commercial name of "Elastollan (registered trademark) (e.g. Elastollan XNY97A)" available from BASF Japan Co., a thermoplastic polystyrene elastomer having a commercial name of "Rabalon (registered trademark) (e.g. Rabalon SR04, Rabalon T3339C, Rabalon T3221C)" available from Mitsubishi Chemical Corporation, in addition to the cured product of the rubber composition and the conventional ionomer resin. Examples of the ionomer resin include an ionomer resin prepared by neutralizing at least a part of carboxyl groups in a copolymer composed of ethylene and $\alpha,\beta$-unsaturated carboxylic acid having 3 to 8 carbon atoms with a metal ion, one prepared by neutralizing at least a part of carboxyl groups in a ternary copolymer composed of ethylene, $\alpha,\beta$-unsaturated carboxylic acid having 3 to 8 carbon atoms and $\alpha,\beta$-unsaturated carboxylic acid ester with a metal ion, or a mixture thereof.

Specific examples of the ionomer resins include, but not limited to, Himilan 1555(Na), Himilan 1557(Zn), Himilan 1605(Na), Himilan 1706(Zn), Himilan 1707 (Na), Himilan AM7311 (Mg), and examples of the ternary copolymer ionomer resin include Himilan 1856(Na) and Himilan 1855(Zn) available from MITSUI-DUPONT POLYCHEMICAL CO., LTD.

Further, ionomer resins available from DUPONT CO. include Surlyn 8945(Na), Surlyn 9945(Zn), Surlyn 8140(Na), Surlyn 8150(Na), Surlyn 9120(Zn), Surlyn 9150 (Zn), Surlyn 6910(Mg), Surlyn 6120(Mg), Surlyn 7930(Li), Surlyn 7940(Li), Surlyn AD8546 (Li), and examples of the ternary copolymer ionomer resin include Surlyn 8120 (Na), Surlyn 8320(Na), Surlyn 9320(Zn), and Surlyn 6320(Mg).

Ionomer resins such as Iotek 8000(Na), Iotek 8030(Na), Iotek 7010 (Zn), and Iotek 7030(Zn) are available from Exxon Co. Examples of the ternary copolymer ionomer resin include Iotek 7510(Zn) and Iotek 7520(Zn). The ionomer resins exemplified above can be used alone, or as a mixture of two or more.

Na, Zn, K, Li, or Mg described in the parentheses after the commercial name of the ionomer resin represents a kind of metal used for neutralization.

In the case the golf ball of the present invention is a three-piece golf ball or a multi-piece golf ball, the diameter of the center is preferably 30 mm or more, more preferably 32 mm or more, preferably 41 mm or less, and more preferably 40.5 mm or less. If the diameter of the center is less than 30 mm, the thickness of the intermediate layer or the cover has to be thicker than desired, resulting in lowering the repulsion property, while if the diameter of the center is more than 41 mm, the thickness of the intermediate layer or the cover has to be thinner than desired and the function of the interlayer or the cover cannot be sufficiently exhibited.

The core of the golf ball of the present invention has a diameter of preferably 39 mm or more, more preferably 39.5 mm or more, even more preferably 40.8 mm or more, preferably 42.2 mm or less, more preferably 42 mm or less, and even more preferably 41.8 mm or less. If the diameter of the core is less than the above lower limit, the cover becomes so thick as to lower the repulsion property, while if the diameter of the core is more than the above upper limit, the thickness of the cover becomes so thin as to make molding of the cover difficult.

In the case that the core has a diameter of from 39 mm to 42.2 mm, the compression deformation amount (deformation amount along the shrinkage direction) of the core when applying a load from 98 N as an initial load to 1275 N as a final load is preferably 2.50 mm or more, more preferably 2.60 mm or more, preferably 3.20 mm or less, and more preferably 3.10 mm or less. If the above deformation amount is less than 2.50 mm, the core becomes too hard, resulting in worsening the shot feeling, while if the above deformation amount is larger than 3.20 mm, the repulsion property may be lowered.

In a preferable embodiment, the core has a hardness difference between the center and the surface. The difference between the surface hardness and the center hardness is preferably 10 or more, more preferably 12 or more, and is preferably 40 or less, more preferably 35 or less, and even more preferably 30 or less in JIS-C hardness. If the hardness difference is more than 40, the durability may be lowered, while if the hardness difference is less than 10, the shot feeling may be hard, resulting in a large impact. The surface hardness of the core is preferably 65 or more, more preferably 70 or more, even more preferably 72 or more, and is preferably 85 or less in JIS-C hardness. If the surface hardness of the core is less than 65 in JIS-C hardness, the surface hardness of the core is so soft and the repulsion property may be lowered, resulting in shortening the flight distance. On the other hand, if the surface hardness of the core is more than 85, the surface hardness of the core is so hard and the shot feeling may be lowered. The center hardness of the core is preferably 45 or more, more preferably 50 or more, and is preferably 70 or less, and more preferably 65 or less in JIS-C hardness. If the core center hardness is less than 45, the center hardness of the core is so soft and the durability may be lowered, while if the core center hardness is more than 70, the center hardness of the core is so hard and the shot feeling may be worsened. The hardness difference of the core can be formed by properly selecting the heat molding conditions of the core.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Evaluation]
(1) Core Hardness (JIS-C)

The hardness measured at a surface part of a spherical core using the JIS-C type spring hardness tester specified by JIS K6301, was determined as the surface hardness of the spherical core, and the JIS-C hardness obtained by cutting a spherical core into halves and measuring at a center of the cut surface was determined as the center hardness of the spherical core.

(2) Compression Deformation Amount (mm)

Compression deformation amount (shrinking amount of the core along the compression direction) was measured when applying a load to the core from 98N as a initial load to 1275 N as a final load.

(3) Slab Hardness (Shore D Hardness)

A sheet having a thickness of about 2 mm were prepared from the cover composition by hot press molding and preserved at the temperature of 23° C. for two weeks. Three or more of the sheets were stacked on one another to avoid being affected by the measuring substrate on which the sheets were placed, and the stack was subjected to the measurement using P1 type auto hardness tester provided with the Shore D type spring hardness tester prescribed by ASTM-D2240, available from KOUBUNSHI KEIKI CO., LTD to obtain the respective slab hardness of the cover composition.

(4) Abrasion-Resistance

A sand wedge (manufactured by SRI sports Ltd, S shaft) was installed on a swing robot M/C available from Golf Laboratories, Inc., and two points of a ball respectively were hit once at the head speed of 36 m/sec. to observe the areas which were hit. Abrasion-resistance was evaluated and ranked into four levels based on following criteria.

E(Excellent): Almost no scratch was present on the surface of the golf ball.

G(Good): Slight scratches were present on the surface of the golf ball, but were not conspicuous.

F(Fair): Scratches were conspicuous, and scuffing could be observed.

P(Poor): The surface of the golf ball was abraded considerably, and scuffing was conspicuous.

(5) Repulsion Coefficient

A metal cylinder having a weight of 1984.4 g was collided with each golf ball at the speed of 40 m/sec to measure the speed of the cylinder and each of the golf balls before and after the collision to calculate the repulsion coefficient of each golf ball from the speed and the weight thereof. The measurement was carried out 12 times for each golf ball, and the average was taken as the repulsion coefficient of the golf ball. Each value of the repulsion coefficient was reduced to an index number relative to the value of golf ball No. 13 being assumed 100. The larger index number indicates better resilience.

[Preparation of the Acid Group-Containing Polyurethane and the Neutralized Product Thereof]

The polyol component (PCDLT 5652) and the diisocyanate component (MDI) shown in Table 1 were put into a flask and stirred at 60° C. for 3 hours in nitrogen atmosphere to produce a prepolymer. Successively, dimethylolbutanoic acid (DMBA) as the acid group-containing chain extender component and propanediol (PD), if required dissolved in the 50 times weight of N,N-dimethylacetamide (N,N-Dimethylacetamide (dehydrated), manufactured by Wako Pure Chemical Industries, Ltd.), were added by drops into the prepolymer over 20 minutes using a titrating funnel. Thereafter, the obtained mixture was stirred at 60° C. for 2 hours to carry out chain extension reaction and a carboxyl group-containing polyurethane was obtained.

Next, magnesium acetate tetrahydrate was dissolved in 10 times weight of methanol (Methanol (dehydrated), manufactured by Wako Pure Chemical Industries, Ltd.) and the obtained solution was added by drops into the carboxyl group-containing polyurethane over 1 minute using a titrating funnel. Thereafter, the obtained mixture was stirred for 1 hour under the above condition to carry out polymerization termination reaction and neutralization reaction, and a solution of the neutralized product of the acid group-containing polyurethane was obtained. The obtained solution was vacuum dried at 90° C. for 48 hours in a vacuum oven to obtain the neutralized product of the acid group-containing polyurethane.

TABLE 1

| | | Un-neutralized product | | | Neutralized product | | |
|---|---|---|---|---|---|---|---|
| | | (C) Acid group-containing polyurethane or neutralized product thereof No. | | | | | |
| | | 1 | 2 | 3 | 1 | 2 | 3 |
| Formulation | PCDL T5652 (molecular weight: 2000) | 1 | 1 | 1 | 1 | 1 | 1 |
| | MDI (molecular weight: 250) | 4 | 4 | 5 | 4 | 4 | 4 |
| | DMBA (molecular weight: 148) | 1 | 0.1 | 4 | 1 | 1 | 1 |
| | PD (molecular weight: 76) | 2 | 3 | 0 | 2 | 2 | 2 |
| | Magnesium acetate tetrahydrate | — | — | — | 0.25 | 0.50 | 0.60 |
| Property | Acid group content ($\times 10^{-4}$ mol/g) | 3.0 | 0.3 | 10.0 | 3.0 | 3.0 | 3.0 |
| | Neutralization degree (mol %) | 0 | 0 | 0 | 25 | 50 | 60 |
| | Neutralization metal | — | — | — | Mg | Mg | Mg |

Formulation: mole ratio
PCDL T5652: manufactured by Asahi Kasei Chemicals Co., Ltd., polycarbonate polyol (hydroxyl group-terminated polyol in which a divalent residue obtained by removing two hydroxyl groups from 1,5-penanediol and a divalent residue obtained by removing two hydroxyl groups from 1,6-hexanediol are bonded randomly at a mole ratio of 50/50 by carbonate bonds; number average molecular weight: 2000)
MDI: manufactured by Sumika Bayer Urethane Co., Ltd.; "Sumidur (registered trademark) 44S"
DMBA: manufactured by Nippon Kasei Chemical Co., Ltd.; dimethylolbutanoic acid
PD: manufactured by Wako Pure Chemical Industries, Ltd.; 1,4-propanediol
Magnesium acetate tetrahydrate: manufactured by Wako Pure Chemical Industries, Ltd.; magnesium acetate tetrahydrate

[Preparation of Golf Ball]
(1) Preparation of Core
Preparation of Core A
The rubber composition for core shown in Table 2 was mixed and pressed with upper and lower molds each having a spherical cavity at the heating condition of 160° C. for 13 minutes to obtain the core A with a diameter of 40.7 mm.
Preparation of Core B
The rubber composition for a center shown in Table 2 was mixed and pressed with upper and lower molds each having a spherical cavity at the heating condition of 170° C. for 15 minutes to obtain a spherical center with a diameter of 40.3 mm. The intermediate layer materials of the formulation shown in Table 2 were mixed by a biaxial mixing extruder to produce an intermediate layer composition in a pellet form. The condition of the extruder was given as follows: a screw diameter=45 mm, a screw rotation speed=200 rpm, and screw L/D=35. The mixture was heated to in the range of 150 to 230° C. at the die position of the extruder. The obtained intermediate layer composition was injection-molded onto the center obtained in the above to produce the core B with a diameter of 41.7 mm having the center and an intermediate layer (thickness 0.7 mm) covering the center.

TABLE 2

| | Core | | A | B |
|---|---|---|---|---|
| Center | Formulation | Polybutadiene rubber | 100 | 100 |
| | | Zinc acrylate | 35 | 35 |
| | | Zinc oxide | 5 | 5 |
| | | Barium sulfate | 14 | 14 |
| | | Diphenyl disulfide | 0.5 | 0.5 |
| | | Dicumyl peroxide | 0.9 | 0.9 |
| | | Diameter (mm) | 40.7 | 40.3 |
| Inter-layer | Formulation | Himilan 1605 | — | 50 |
| | | Himilan AM7329 | — | 50 |
| | | Thickness (mm) | — | 0.7 |
| Core | Property | Diameter (mm) | 40.7 | 41.7 |
| | | Surface hardness (JIS-C) | 85 | 98 |
| | | Center hardness (JIS-C) | 66 | 65 |
| | | Compression deformation amount (mm) | 2.90 | 2.55 |

Mixing: mass part
Notes on Table 2,
Polybutadiene rubber: BR730 (high cis-polybutadiene) manufactured by JSR Corporation
Zinc oxide: Ginrei R manufactured by Toho-Zinc Co.
Zinc acrylate: ZNDA-90S manufactured by NIHON JYORYU KOGYO Co,. LTD.
Barium sulfate: barium sulfate BD manufactured by Sakai Chemical Industry Co. Ltd.
Dicumyl peroxide: Percumyl D manufactured by NOF Corporation
Diphenyl disulfide: manufactured by Sumitomo Seika Chemicals Company Limited
Himilan 1605: sodium ion-neutralized ethylene-methacrylic acid copolymerized ionomer resin manufactured by MITSUI-DUPONT POLYCHEMICAL CO., LTD.
Himilan AM7329: zinc ion-neutralized ethylene-methacrylic acid copolymerized ionomer resin manufactured by MITSUI-DUPONT POLYCHEMICAL CO., LTD.

(2) Preparation of the Cover Composition
Using the acid group-containing polyurethane synthesized in the above and the neutralized product thereof, the cover materials having a formulation shown in Table 3 were mixed by a biaxial mixing extruder to produce a cover composition in a pellet form. The condition of the extruder was given as follows: a screw diameter=45 mm, a screw rotation speed=200 rpm, and screw L/D=35.
(3) Molding of Half Shell
Compression molding of a half shell was carried out by charging the cover composition in the form of a pellet obtained in the above into a depressed part of the lower mold for molding half shell and applying pressure to mold a half shell. The compression molding was carried out at the molding temperature of 180° C. for 5 minutes under the molding pressure of 100 kgf/cm².
(4) Molding of Cover
The core obtained in the above (1) was covered with two half shells obtained in the above (3) and the cover was molded by compression molding. The molding was carried out at a molding temperature of 140° C. for 3 minutes under the molding pressure of 100 kgf/cm² to obtain a golf ball body. The surface of the obtained golf ball body was subjected to the sandblast treatment and marking followed by coating a clear paint, drying the paint at 40° C. in an oven to obtain a golf ball with a diameter of 42.7 mm and a weight of 45.4 g. The structure of the obtained golf ball, the formulation of the cover composition, and the results of evaluation concerning the abrasion resistance and repulsion coefficient of the obtained golf ball are shown in Table 3.

TABLE 3

| | | | Golf ball No. | | | | | | | | | |
| --- | --- | --- | --- | --- | --- | --- | --- | --- | --- | --- | --- | --- |
| | | | | 1 | 2 | 3 | 4 | 5 | 6 | 7 | 8 | 9 |
| Cover | | Structure | | 2P | 2P | 2P | 2P | 2P | 2P | 2P | 2P | 2P |
| | | Core type | | A | A | A | A | A | A | A | A | A |
| | Formulation | (A) Thermoplastic polyurethane | Elastollan XNY 90A | 95 | 70 | 30 | 4 | 70 | 70 | 70 | 70 | 70 |
| | | | Elastollan ET 890 | — | — | — | — | — | — | — | — | — |
| | | (B) Thermoplastic resin | Himilan 1605 | 2.5 | 15 | 35 | 48 | 15 | 15 | 15 | 15 | 15 |
| | | | Himilan 1557 | 2.5 | 15 | 35 | 48 | 15 | 15 | 15 | 15 | 15 |
| | | | Himilan 1855 | — | — | — | — | — | — | — | — | — |
| | | (C) Acid group-containing polyurethane or neutralized product thereof | Un-neutralized product 1 | 10 | 10 | 10 | 10 | — | — | — | — | — |
| | | | Un-neutralized product 2 | — | — | — | — | 10 | — | — | — | — |
| | | | Un-neutralized product 3 | — | — | — | — | — | 10 | — | — | — |
| | | | Neutralized product 1 | — | — | — | — | — | — | 10 | — | — |
| | | | Neutralized product 2 | — | — | — | — | — | — | — | 10 | — |
| | | | Neutralized product 3 | — | — | — | — | — | — | — | — | 10 |
| | | Titanium oxide | | 4 | 4 | 4 | 4 | 4 | 4 | 4 | 4 | 4 |
| | | Thickness (mm) | | 1.0 | 1.0 | 1.0 | 1.0 | 1.0 | 1.0 | 1.0 | 1.0 | 1.0 |
| | | Slab hardness (Shore D) | | 44 | 48 | 54 | 57 | 48 | 48 | 50 | 52 | 53 |
| Property | | Abrasion resistance | | E | G | G | F | F | G | G | G | G |
| | | Repulsion coefficient | | 103 | 116 | 121 | 123 | 111 | 114 | 115 | 114 | 113 |

| | | | Golf ball No. | | | | | | | | | |
| --- | --- | --- | --- | --- | --- | --- | --- | --- | --- | --- | --- | --- |
| | | | | 10 | 11 | 12 | 13 | 14 | 15 | 16 | 17 | 18 |
| Cover | | Structure | | 2P | 2P | 2P | 2P | 2P | 3P | 2P | 2P | 2P |
| | | Core type | | A | A | A | A | A | B | A | A | A |
| | Formulation | (A) Thermoplastic polyurethane | Elastollan XNY 90A | 70 | 70 | 70 | 70 | — | 70 | 100 | — | 70 |
| | | | Elastollan ET 890 | — | — | — | — | 70 | — | — | — | — |
| | | (B) Thermoplastic resin | Himilan 1605 | 15 | 15 | 15 | 15 | 15 | 15 | — | — | 15 |
| | | | Himilan 1557 | 15 | 15 | 15 | 15 | 15 | 15 | — | — | 15 |
| | | | Himilan 1855 | — | — | — | — | — | — | — | 100 | — |
| | | (C) Acid group-containing polyurethane or neutralized product thereof | Un-neutralized product 1 | 1 | 25 | 50 | 60 | 10 | 10 | 10 | 10 | — |
| | | | Un-neutralized product 2 | — | — | — | — | — | — | — | — | — |
| | | | Un-neutralized product 3 | — | — | — | — | — | — | — | — | — |
| | | | Neutralized product 1 | — | — | — | — | — | — | — | — | — |
| | | | Neutralized product 2 | — | — | — | — | — | — | — | — | — |
| | | | Neutralized product 3 | — | — | — | — | — | — | — | — | — |
| | | Titanium oxide | | 4 | 4 | 4 | 4 | 4 | 4 | 4 | 4 | 4 |
| | | Thickness (mm) | | 1.0 | 1.0 | 1.0 | 1.0 | 1.0 | 0.5 | 1.0 | 1.0 | 1.0 |
| | | Slab hardness (Shore D) | | 47 | 49 | 49 | 50 | 48 | 48 | 43 | 54 | 47 |
| Property | | Abrasion resistance | | G | G | G | F | G | G | G | P | P |
| | | Repulsion coefficient | | 105 | 102 | 101 | 100 | 111 | 116 | 95 | 125 | 105 |

Formulation: mass part
Elastollan XNY90A: A polyether type thermoplastic polyurethane elastomer available BASF polyurethane elastomers, Ltd.
Elastollan ET890: A polyether type thermoplastic polyurethane elastomer available BASF polyurethane elastomers, Ltd.
Himilan 1605: sodium ion-neutralized ethylene-methacrylic acid copolymerized ionomer resin manufactured by MITSUI-DUPONT POLYCHEMICAL CO., LTD.
Himilan 1557: zinc ion-neutralized ethylene-methacrylic acid copolymerized ionomer resin manufactured by MITSUI-DUPONT POLYCHEMICAL CO., LTD.

Himilan 1855: zinc ion-neutralized ethylene-methacrylic acid copolymerized ionomer resin manufactured by MITSUI-DUPONT POLYCHEMICAL CO., LTD.

The golf ball Nos. 1 to 15 were the case where the cover is made from a cover composition containing, as the resin component, the thermoplastic polyurethane (A) having no ionic group; at least one kind of the thermoplastic resin (B) selected from the group consisting of the binary copolymer of the olefin and the unsaturated carboxylic acid, the tertiary copolymer of the olefin, unsaturated carboxylic acid and unsaturated carboxylic acid ester, and the neutralized products thereof; and the acid group-containing polyurethane and/or the neutralized product thereof (C). These golf balls were excellent in the abrasion resistance and the repulsion coefficient.

With respect to the golf ball No. 4, since the content ratio of the thermoplastic polyurethane (A) relative to the thermoplastic resin (B) was small, the repulsion coefficient was excellent but the abrasion resistance was slightly lowered. With respect to the golf ball No. 5, since the acid group content of the acid group-containing polyurethane and/or the neutralized product thereof (C) was low, the repulsion coefficient was excellent but the abrasion resistance was slightly lowered. Further, with respect to the golf ball No. 13, since the content of the acid group-containing polyurethane and/or the neutralized product thereof (C) was high relative to the thermoplastic polyurethane (A) and the thermoplastic resin (B), the abrasion resistance was slightly lowered.

The golf ball Nos. 16 to 18 were the case where the cover compositions did not contain one of the thermoplastic polyurethane (A), the thermoplastic resin (B), and the acid group-containing polyurethane and/or the neutralized product thereof (C), and it was found that all of these golf balls were poor in the abrasion resistance and/or the repulsion property as compared with the golf ball Nos. 1 to 15.

The invention relates to a golf ball and more particularly to a golf ball excellent in abrasion resistance and the repulsion property. This application is based on Japanese Patent application No. 2007-291264 filed on Nov. 8, 2007, the contents of which are hereby incorporated by reference.

What is claimed is:

1. A golf ball comprising a core and a cover covering the core, wherein
    the cover is made from a cover composition containing, as a resin component,
    a thermoplastic polyurethane (A) having no ionic group;
    at least one kind of thermoplastic resin (B) selected from the group consisting of a binary copolymer of an olefin and an unsaturated carboxylic acid, a tertiary copolymer of an olefin, an unsaturated carboxylic acid and an unsaturated carboxylic acid ester, and neutralized products thereof; and
    an acid group-containing polyurethane and/or a neutralized product thereof (C).

2. The golf ball according to claim 1, wherein the acid group of the acid group-containing polyurethane is at least one kind selected from the group consisting of a carboxyl group, a sulfonic acid group, and a phosphonic acid group.

3. The golf ball according to claim 1, wherein the acid group-containing polyurethane has an acid group content of $0.5 \times 10^{-4}$ mol/g to $20 \times 10^{-4}$ mol/g.

4. The golf ball according to claim 1, wherein the cover composition contains the acid group-containing polyurethane and/or the neutralized product thereof (C) in an amount of 1 part by mass to 50 parts by mass relative to 100 parts by mass of a total of the thermoplastic polyurethane (A) and the thermoplastic resin (B).

5. The golf ball according to claim 1, wherein the thermoplastic polyurethane (A) and the thermoplastic resin (B) are blended in the cover composition (a total of 100 parts by mass) in a ratio of the thermoplastic polyurethane (A)/the thermoplastic resin (B)=5 parts to 95 parts/95 parts to 5 parts by mass.

6. The golf ball according to claim 1, wherein the cover composition has a slab hardness of 30 or more and 57 or less in Shore D hardness.

7. The golf ball according to claim 3, wherein the cover composition contains the acid group-containing polyurethane and/or the neutralized product thereof (C) in an amount of 1 part by mass to 50 parts by mass relative to 100 parts by mass of a total of the thermoplastic polyurethane (A) and the thermoplastic resin (B).

8. The golf ball according to claim 7, wherein the thermoplastic polyurethane (A) and the thermoplastic resin (B) are blended in the cover composition (a total of 100 parts by mass) in a ratio of the thermoplastic polyurethane (A)/the thermoplastic resin (B)=5 parts to 95 parts/95 parts to 5 parts by mass.

9. A golf ball comprising a core and a cover covering the core, wherein
    the cover is made from a cover composition containing, as a resin component,
    a thermoplastic polyurethane (A) having no ionic group;
    at least one kind of thermoplastic resin (B) selected from the group consisting of neutralized products of a binary copolymer of an olefin and an unsaturated carboxylic acid, and a tertiary copolymer of an olefin, an unsaturated carboxylic acid and an unsaturated carboxylic acid ester; and
    an un-neutralized product of an acid group-containing polyurethane (C).

10. The golf ball according to claim 9, wherein the acid group-containing polyurethane has an acid group content of $0.5 \times 10^{-4}$ mol/g to $20 \times 10^{-4}$ mol/g.

11. The golf ball according to claim 10, wherein the cover composition contains the acid group-containing polyurethane (C) in an amount of 1 part by mass to 50 parts by mass relative to 100 parts by mass of a total of the thermoplastic polyurethane (A) and the thermoplastic resin (B).

12. The golf ball according to claim 11, wherein the thermoplastic polyurethane (A) and the thermoplastic resin (B) are blended in the cover composition (a total of 100 parts by mass) in a ratio of the thermoplastic polyurethane (A)/the thermoplastic resin (B)=5 parts to 95 parts/95 parts to 5 parts by mass.

13. A golf ball comprising a core and a cover covering the core, wherein
    the cover is made from a cover composition containing, as a resin component,
    a thermoplastic polyurethane (A) having no ionic group;
    at least one kind of thermoplastic resin (B) selected from the group consisting of neutralized products of a binary copolymer of an olefin and an unsaturated carboxylic acid, and a tertiary copolymer of an olefin, an unsaturated carboxylic acid and an unsaturated carboxylic acid ester; and
    a neutralized product of an carboxyl group-containing polyurethane (C).

14. The golf ball according to claim 13, wherein (C) has an acid group content of $0.5 \times 10^{-4}$ mol/g to $20 \times 10^{-4}$ mol/g prior to neutralization.

15. The golf ball according to claim 14, wherein the cover composition contains the neutralized product thereof (C) in an amount of 1 part by mass to 50 parts by mass relative to 100 parts by mass of a total of the thermoplastic polyurethane (A) and the thermoplastic resin (B).

16. The golf ball according to claim 15, wherein the thermoplastic polyurethane (A) and the thermoplastic resin (B) are blended in the cover composition (a total of 100 parts by mass) in a ratio of the thermoplastic polyurethane (A)/the thermoplastic resin (B)=5 parts to 95 parts/95 parts to 5 parts by mass.

17. The golf ball according to claim 16, wherein the neutralized product of the carboxyl group-containing polyurethane has a neutralization degree of 40 mol % or less.

* * * * *